(12) United States Patent
Liu

(10) Patent No.: US 11,603,629 B2
(45) Date of Patent: Mar. 14, 2023

(54) CONTAINER AND PREPARATION METHOD THEREOF

(71) Applicants: Beijing BOE Technology Development Co., Ltd., Beijing (CN); BOE TECHNOLOGY GROUP CO., LTD., Beijing (CN)

(72) Inventor: Kairan Liu, Beijing (CN)

(73) Assignees: Beijing BOE Technology Development Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 682 days.

(21) Appl. No.: 16/569,901

(22) Filed: Sep. 13, 2019

(65) Prior Publication Data

US 2020/0240083 A1 Jul. 30, 2020

(30) Foreign Application Priority Data

Jan. 24, 2019 (CN) .......................... 201910068304.4

(51) Int. Cl.
*D21H 11/20* (2006.01)
*C08B 31/18* (2006.01)
(Continued)

(52) U.S. Cl.
CPC ............. *D21H 11/20* (2013.01); *B65D 85/00* (2013.01); *C08B 15/04* (2013.01); *C08B 31/18* (2013.01); *B82Y 30/00* (2013.01); *B82Y 40/00* (2013.01)

(58) Field of Classification Search
None
See application file for complete search history.

(56) References Cited

U.S. PATENT DOCUMENTS

2017/0101738 A1* 4/2017 Carter .................. D21C 3/003

FOREIGN PATENT DOCUMENTS

| CN | 106117613 A | 11/2016 |
| CN | 106633200 A | 5/2017 |

(Continued)

OTHER PUBLICATIONS

"First Office Action and English language translation", CN Application No. 201910068304.4, dated Nov. 23, 2020, 18 pp.
(Continued)

*Primary Examiner* — Stefanie J Cohen
(74) *Attorney, Agent, or Firm* — Myers Bigel, P.A.

(57) ABSTRACT

A container and a preparation method thereof are provided. A material forming the container includes at least two types of oxidized nanocelluloses interlaced with each other, the at least two types of oxidized nanocelluloses being configured to have different degrees of expansion after absorbing moisture in a same environment. In a dry condition, the at least two types of oxidized nanocelluloses do not expand, so the structure of the container is relatively dense and the air permeability is poor, which can sufficiently maintain moisture of an article stored in the container. In case the article itself or other reasons cause high humidity, different oxidized nanocelluloses of the container expand after absorbing moisture, so that gaps between different oxidized nanocelluloses becomes larger, and the air permeability of the container becomes better, which can discharge excessive moisture, enabling the container to self-adjust the air permeability based on humidity.

12 Claims, 4 Drawing Sheets

(51) Int. Cl.
*B65D 85/00* (2006.01)
*C08B 15/04* (2006.01)
*B82Y 40/00* (2011.01)
*B82Y 30/00* (2011.01)

(56) References Cited

FOREIGN PATENT DOCUMENTS

| | | | |
|---|---|---|---|
| CN | 106967176 A | 7/2017 | |
| CN | 107759947 A | 3/2018 | |
| CN | 108265564 A | 7/2018 | |
| CN | 108273130 A | 7/2018 | |
| CN | 108503900 A | 9/2018 | |
| WO | WO-2017066119 A1 * | 4/2017 | ............. C08B 15/02 |

OTHER PUBLICATIONS

"Second Office Action and English language translation", CN Application No. 201910068304.4, dated Jun. 11, 2021.

* cited by examiner

CONTAINER AND PREPARATION METHOD THEREOF

RELATED APPLICATION

The present application claims the benefit of Chinese Patent Application No. 201910068304.4, filed on Jan. 24, 2019, the entire disclosure of which is incorporated herein by reference.

TECHNICAL FIELD

The present disclosure relates to the field of food preservation technologies, and specifically to a container for food preservation and a preparation method thereof.

BACKGROUND

At present, a common method for food preservation is refrigeration. Food is directly put into a refrigerator so that the food is in a low temperature environment, which can effectively slow down the process of food spoilage. However, conditions for keeping food fresh involve three factors: temperature, humidity, and air. Refrigeration can only guarantee the temperature, but cannot guarantee the humidity and the air. If the humidity is too low, food such as vegetables, fruits, and the like will quickly lose a lot of moisture and dry up, so that they are not fit to eat. Preservative films are usually used in life to prevent moisture loss. However, if moisture is too much, food will soon rot. In life, rot often occurs in fruits and vegetables which are put in bags or preservative films due to high humidity because moisture cannot be removed. There is no good solution at present to how to ensure that the moisture of food will not be lost too much while the food will not rot due to high humidity.

SUMMARY

An embodiment of the disclosure provides a container comprising at least two types of oxidized nanocelluloses interlaced with each other, the at least two types of oxidized nanocelluloses being configured to have different degrees of expansion after absorbing moisture in a same environment.

In some embodiments, the at least two types of oxidized nanocelluloses have different contents of carboxyl groups.

In some embodiments, the at least two types of oxidized nanocelluloses comprise an unmodified oxidized nanocellulose and a modified oxidized nanocellulose.

In some embodiments, the modified oxidized nanocellulose comprises a polysaccharide-modified oxidized nanocellulose.

In some embodiments, the polysaccharide-modified oxidized nanocellulose comprises a starch-modified oxidized nanocellulose.

In some embodiments, the at least two types of oxidized nanocelluloses comprise at least one selected from a group consisting of a spheroidal oxidized nanocellulose, a rod-shaped oxidized nanocellulose, and a fibrous oxidized nanocellulose.

In some embodiments, the at least two types of oxidized nanocelluloses comprise a spheroidal oxidized nanocellulose, the spheroidal oxidized nanocellulose comprises: an oxidized nanocellulose shell defining an accommodation space, and a cellulose hydrolase filled in the accommodation space.

In some embodiments, the container comprises at least one selected from a group consisting of a bag, a box, a bowl, a dish, a preservative film, and a preservative paper.

Another embodiment of the disclosure provides a method for preparing the container according to the above embodiment, comprising: performing oxidization treatment on celluloses in different conditions respectively to obtain at least two types of oxidized celluloses, the at least two types of oxidized celluloses having different contents of carboxyl groups; performing homogenization treatment on the at least two types of oxidized celluloses to obtain a slurry comprising at least two types of oxidized nanocelluloses, and pouring the slurry comprising at least two types of oxidized nanocelluloses into a mold and performing drying treatment.

In some embodiments, pouring the slurry comprising at least two types of oxidized nanocelluloses into the mold and performing drying treatment comprises: filtering the slurry comprising at least two types of oxidized nanocelluloses using a microporous filter membrane to filter out water, and drying the slurry from which water has been filtered out.

In some embodiments, the celluloses comprise a bleached kraft pulp.

Another embodiment of the disclosure provides a method for preparing the container according to the above embodiment, the method comprising: performing oxidization treatment on celluloses to obtain oxidized celluloses; performing homogenization treatment on the oxidized celluloses to obtain oxidized nanocelluloses; performing modification treatment on the oxidized nanocelluloses using a polysaccharide solution to obtain a slurry comprising at least one type of modified oxidized nanocellulose, and pouring the slurry comprising at least one type of modified oxidized nanocellulose into a mold and performing drying treatment.

In some embodiments, pouring the slurry comprising at least one type of modified oxidized nanocellulose into a mold and performing drying treatment comprises: filtering the slurry comprising at least one type of modified oxidized nanocellulose using a microporous filter membrane to filter out water, and drying the slurry from which water has been filtered out.

DETAILED DESCRIPTION OF EMBODIMENTS

Figure 1:
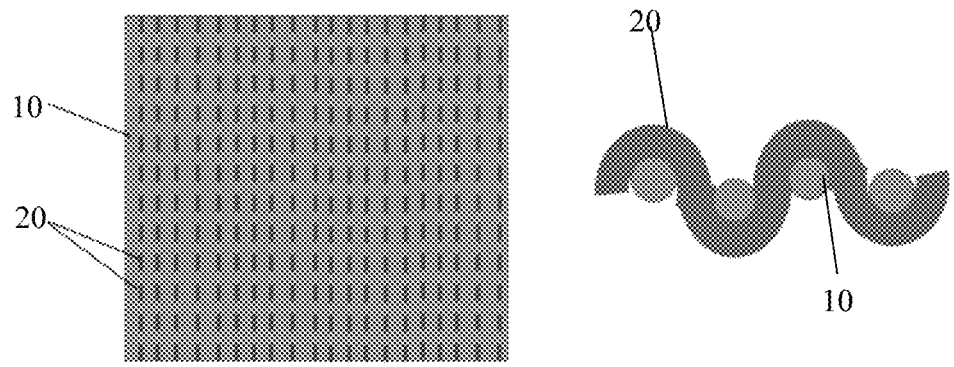
FIG. 1 is a schematic view of a container according to an embodiment of the present disclosure, where the left graph is a schematic planar view of the container, and the right graph is a schematic sectional view of the container.

Embodiments of the present disclosure will be described in detail below. The embodiments described below are exemplary for illustrating the present disclosure only, and are not to be construed as limiting the scope of the present application. Embodiments for which specific techniques or conditions are not specified may be carried out in accordance with the techniques or conditions described in the literature known in the art or in accordance with the product specifications. Reagents or instruments used without specifying the manufacturer are conventional products that are commercially available.

In an aspect of the present disclosure, a container is provided. According to an embodiment of the present disclosure, a material forming the container comprises at least two types of oxidized nanocelluloses interlaced with each other, and the at least two types of oxidized nanocelluloses are configured to have different degrees of expansion after absorbing moisture in the same environment. Thus, in a dry environment, the oxidized nanocellulose forming the container does not expand, so the structure of the container is relatively dense and compact, and the air permeability is poor, which can sufficiently maintain moisture of food. In case the food itself or other reasons cause high humidity, the oxidized nanocelluloses of the container expand after absorbing moisture, and different types of oxidized nanocelluloses have different degrees of expansion, which results in larger gaps between the oxidized nanocelluloses. The larger the size of the oxidized nanocellulose is, the larger the gap between adjacent oxidized nanocelluloses will be. Moreover, the different degrees of expansion of different types of oxidized nanocelluloses after absorbing moisture causes the size differences between different oxidized nanocelluloses to be greater. This further increases gaps between the oxidized nanocelluloses, so that the air permeability of the container becomes better, which can discharge excessive moisture. Therefore, the container provided by the embodiment of the present disclosure can adjust the air permeability by itself based on humidity, which can in turn sufficiently maintain the moisture of the food stored therein, and will not cause the food to rot and spoil due to too much moisture. Although the mechanical strength of the expanded oxidized nanocellulose after moisture absorption will become poor, the oxidized nanocelluloses having a relatively smaller degree of expansion of the container can guarantee the basic mechanical strength and meet the basic function of the container.

In some of the following examples, the structure and performance of the container proposed by the embodiment of the present disclosure are described by way of example in the case where the container is a container for food preservation, but the container proposed by the embodiment of the disclosure may also be used to store other non-food items. Examples of such non-food items include, but are not limited to, pharmaceuticals, articles that require moisture protection, and the like. Accordingly, the container described in the embodiment of the present disclosure does not limit the container claimed in the present application to a container for storing food.

Referring to FIG. 1, the principle of adjusting the air permeability by the container will be further described below in detail based on an example in which the material forming the container comprises two different types of oxidized nanocelluloses, i.e., a first oxidized nanocellulose 10 and a second oxidized nanocellulose 20. In the container, the two types of oxidized nanocelluloses are interlaced with each other. The phrase "interlaced with each other" herein may mean that the two types of oxidized nanocelluloses are interlaced in a regular arrangement (e.g., see FIG. 1), or may be randomly interlaced with each other. The terms "interlacing" or "interlaced" as referred to herein means that different types of oxidized nanocelluloses are arranged in different orientations so that they cross each other. In a dry condition, the first oxidized nanocellulose 10 and the second oxidized nanocellulose 20 do not expand, so the sizes thereof are relatively small, the oxidized nanocelluloses are densely arranged, and the air permeability of the container is poor, which can sufficiently prevent the moisture in food from being lost too much at this time. In an environment with high humidity, the first oxidized nanocellulose 10 and the second oxidized nanocellulose 20 expand after absorbing moisture and become larger in diameter, and the second oxidized nanocellulose 20 has stronger water absorptivity and has a greater degree of expansion than that of the first oxidized nanocellulose 10 after absorbing moisture. On the one hand, this results in a large difference in diameters between the first oxidized nanocellulose 10 and the second oxidized nanocellulose 20, so that gaps between the interlaced first oxidized nanocellulose 10 and second oxidized nanocellulose 20 are increased. On the other hand, this also increases gaps between adjacent first oxidized nanocelluloses 10 and gaps between adjacent second oxidized nanocelluloses 20 (it is similar to the principle of air permeability of a braid, when the threads of a braid are thin, the braid is dense and has poor air permeability, while a braid woven by thicker threads has better air permeability). At this time, the air permeability of the container is enhanced, and redundant moisture can be dispersed outside the container through the increased gaps to prevent food spoilage resulting from too high humidity.

It is to be noted that the term "oxidized nanocellulose" as referred to herein indicates a nanocellulose having undergone oxidation treatment, that is, a product obtained by oxidizing part or all of the hydroxyl groups of the nanocellulose into carboxyl groups. The term "degree of expansion" as used herein refers to a degree of volume expansion of the oxidized nanocellulose after it has absorbed moisture. The term "container" as used herein shall be understood in a broad sense, which includes not only vessels that have certain accommodation space and can directly hold articles, such as bags, boxes, bowls, dishes, and the like, but also products that can hold articles after their shapes are manually changed, such as films or paper having a two-dimensional structure. For example, a film or paper may be used to wrap food in daily life, or a film or paper may be formed into a predetermined shape to hold food.

Inventors of the present application have found that the content of carboxyl groups in the oxidized nanocellulose is one of the main factors affecting the water absorptivity of the oxidized nanocellulose. Thus, the contents of carboxyl groups in the oxidized nanocelluloses can be adjusted to make the degrees of expansion of the oxidized nanocelluloses different after moisture absorption. Therefore, in some embodiments of the present disclosure, the material forming the container described above comprises different types of oxidized nanocelluloses having different contents of carboxyl groups. According to an embodiment of the disclosure, the greater the difference in the contents of carboxyl groups in different types of oxidized nanocelluloses is, the greater the difference in the degrees of expansion of these oxidized nanocelluloses after absorbing moisture will be, which enables the container to have good air permeability in the case of high humidity. The content of carboxyl groups in the oxidized nanocellulose can be controlled. Therefore, the contents of carboxyl groups in different oxidized nanocelluloses can be flexibly adjusted according to the humidity of an actual application environment, the category of food, etc., so as to obtain a container having suitable air permeability.

According to an embodiment of the disclosure, the content of carboxyl groups in the oxidized nanocellulose can be adjusted by means of different oxidation conditions. For example, all of the hydroxyl groups in the nanocellulose can be oxidized into carboxyl groups, or hydroxyl groups on different carbon atoms of the nanocellulose can be selectively oxidized. In addition, the nanocellulose that has undergone oxidation treatment may be modified to adjust the content of carboxyl groups. For example, some substances (referred to as modifying substances) capable of reacting with carboxyl groups may be used to modify the nanocellulose that has undergone oxidization treatment. Modified oxidized nanocelluloses having different contents of carboxyl groups can be obtained by using different amounts of modifying substances. Thus, in some embodiments of the present disclosure, the different types of oxidized nanocelluloses forming the container may comprise unmodified oxidized nanocelluloses and modified oxidized nanocelluloses (i.e., products obtained by modifying the carboxyl groups in the oxidized nanocelluloses).

According to an embodiment of the present disclosure, a substance that can be used to modify the oxidized nanocellulose may comprise a hydroxyl group, and the hydroxyl group may react with a carboxyl group to form an ester group having poor water absorptivity. As a result, different oxidized nanocelluloses having different contents of carboxyl groups can be obtained by using different amounts of modifying substances, and the stability of the container upon water contact can be improved. In some embodiments, modifying substances that can be employed comprise a polysaccharide containing a large amount of hydroxyl groups, that is, the modified oxidized nanocelluloses described above may comprise polysaccharide-modified oxidized nanocelluloses. Polysaccharide raw materials are widely available, which are non-toxic, harmless, and safe for food preservation.

According to an embodiment of the disclosure, those skilled in the art can flexibly select specific categories of polysaccharides that can be employed as needed. In some embodiments, the oxidized nanocellulose may be modified using starch, that is, the polysaccharide-modified oxidized nanocelluloses may comprise starch-modified oxidized nanocelluloses. This can achieve a good modification effect, and the material is widely and easily available, and low in cost.

According to an embodiment of the disclosure, shapes of different oxidized nanocelluloses forming the container comprise at least one of a spherical shape, a rod-like shape, and a fibrous shape, which facilitates preparation of the oxidized nanocellulose. The oxidized nanocelluloses of these shapes can be effectively interlaced to form a container.

Figure 2:
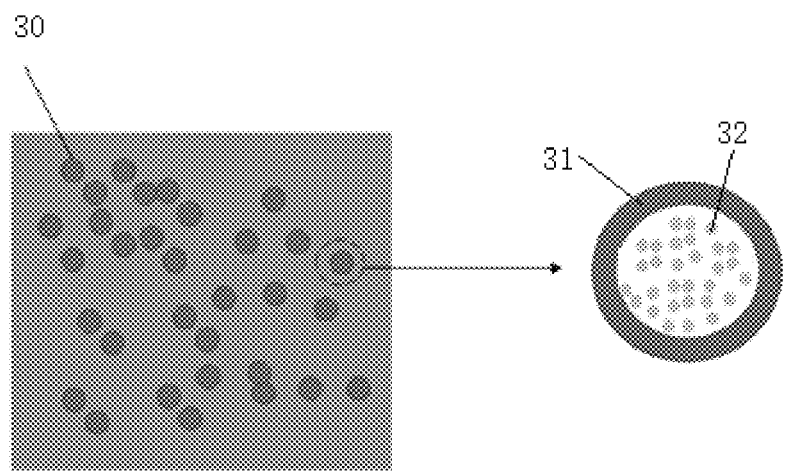
FIG. 2 is a schematic view of a container according to another embodiment of the present disclosure, where the left graph is a schematic planar view of the container, and the right graph is an enlarged schematic view of spherical oxidized nanocellulose.
Figure 3:
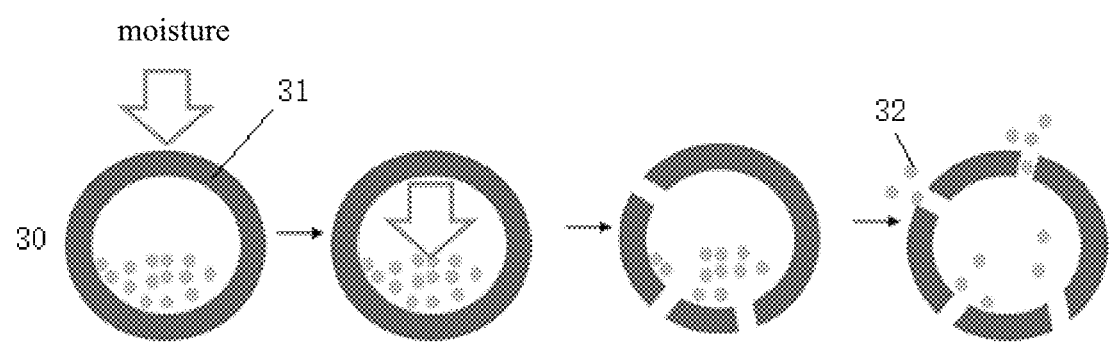
FIG. 3 is a schematic view illustrating a degradation process of spherical oxidized nanocellulose after absorbing moisture according to an embodiment of the present disclosure.

According to an embodiment of the disclosure, at least one of the different types of the oxidized nanocelluloses is a spherical oxidized nanocellulose. Referring to FIG. 2, the spheroidal oxidized nanocellulose 30 comprises an oxidized nanocellulose shell 31 defining an accommodation space and a cellulose hydrolase 32 filled in the accommodation space. Therefore, referring to FIG. 3, when the container is in an environment with high humidity, after the water absorption amount of the spherical oxidized nanocellulose 30 reaches a certain degree, moisture enters the accommodation space inside the spherical oxidized nanocellulose 30 to come into contact with the cellulose hydrolase 32, so that the oxidized nanocellulose shell 31 is degraded into small molecules, and the original shape of the oxidized nanocellulose shell is changed, forming gaps between the oxidized nanocelluloses, which results in good air permeability of the container. Moreover, in the case where a large amount of cellulose hydrolase is contained, the cellulose hydrolase 32 would escape after the oxidized nanocellulose shell is degraded and the escaped cellulose hydrolase 32 can continue to degrade other oxidized nanocelluloses to form more and larger gaps, thereby achieving better air permeability of the container.

Figure 4:
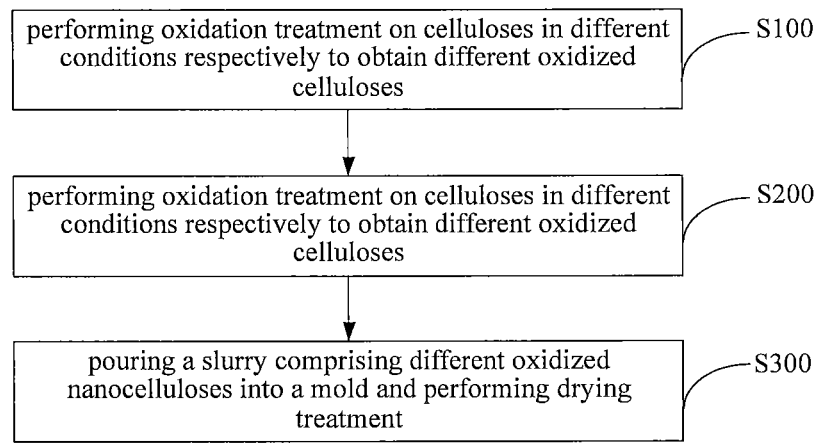
FIG. 4 is a flow chart of a method for preparing a container according to an embodiment of the present disclosure.

In another aspect of the present disclosure, there is provided a method for preparing the container described above. According to an implementation of the present disclosure, referring to FIG. 4, the method comprises the following steps.

S100, performing oxidation treatment on celluloses in different conditions respectively to obtain at least two types of oxidized celluloses, the at least two types of oxidized celluloses having different contents of carboxyl groups.

According to an embodiment of the disclosure, the cellulose can be oxidized in this step by any conventional oxidation method which can be flexibly selected by those skilled in the art as needed. In some embodiments, the cellulose may be oxidized by means of a TEMPO-NaClO-NaBr system, a $NO_2$ system, a nitrate system, and the like, and a plurality of different oxidized celluloses may be obtained by adjusting the ratio of the materials, reaction conditions, and the like. In some embodiments, the cellulose may be oxidized using the TEMPO-NaClO-NaBr system so that the hydroxyl groups in the cellulose are oxidized into carboxyl groups. During the process, the content of carboxyl groups in the oxidized cellulose may adjusted by adjusting the oxidation system, the amount of cellulose, and the conditions of the oxidation reaction, to obtain different oxidized celluloses having different contents of carboxyl groups. The specific adjustment measures can be determined by those skilled in the art as needed.

According to an embodiment of the disclosure, the form of the cellulose used in this step is not limited at all, which may be any conventional pure cellulose, a cellulose-containing raw material or the like. In some embodiments, the cellulose is provided in the form of a bleached kraft pulp.

Figure 5:
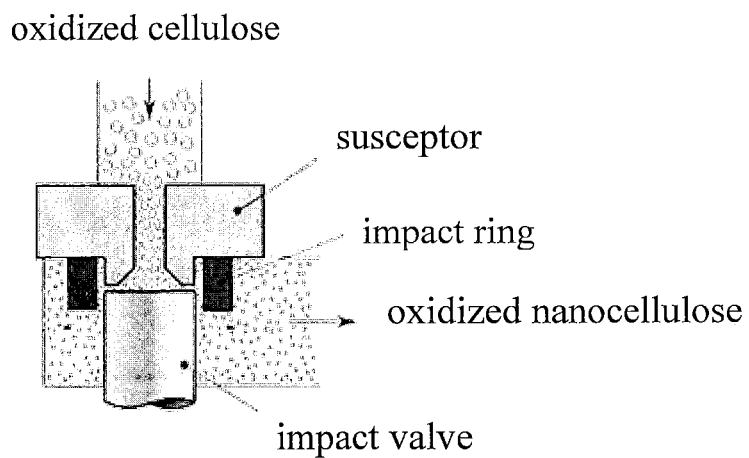
FIG. 5 is a schematic view illustrating a homogenization process according to an embodiment of the present disclosure.

S200: performing homogenization treatment on the at least two types of oxidized celluloses to obtain a slurry comprising at least two types of oxidized nanocelluloses. Since the at least two types of oxidized celluloses obtained previously by oxidizing a cellulose in different conditions have different contents of carboxyl groups, the at least two types of oxidized nanocelluloses obtained in this step have different degrees of expansion after absorbing moisture in the same environment. According to an embodiment of the present disclosure, this step may be performed according to a conventional homogenization treatment, and specific conditions and parameters may be flexibly determined by those skilled in the art as needed. In some embodiments, a specific homogenization process may refer to FIG. 5. The homogenization process shown in FIG. 5 is actually a process of extruding and comminuting an oxidized cellulose in high pressure conditions. In FIG. 5, the impact valve, the impact ring, and the susceptor can cooperate with each other to carry out the process of extruding and comminuting an oxidized cellulose, thereby obtaining an oxidized nanocellulose.

S300: pouring the slurry comprising at least two types of oxidized nanocelluloses into a mold and performing drying treatment.

According to an embodiment of the disclosure, in this step, a suitable mold may be selected according to the shape of the container to be obtained, and pouring the slurry into the mold enables the slurry to form a predetermined shape. The slurry is then subjected to drying treatment. Specific drying conditions are not particularly limited, and may be flexibly selected depending on the categories of raw materials, the performance of the container to be obtained, etc., which may be, for example, vacuum drying or the like. For example, in some embodiments, the slurry may be poured into a mold having a flat surface, and after drying, paper for food preservation can be obtained.

In some embodiments, the container may be prepared by means of filtration in this step. For example, taking preparation of paper for food preservation as an example, a microporous filter membrane may be placed on a sand core, and a certain amount of the slurry comprising at least two types of oxidized nanocelluloses is taken for filtration, that is, the slurry comprising at least two types of oxidized nanocelluloses is filtered using a microporous filter membrane to filter out water, and the slurry from which water has been filtered out is then dried. For example, after the slurry on the filter membrane is dehydrated and concentrated into a jelly-like thin layer, it may be placed in a vacuum drying oven for drying to thereby obtain paper for food preservation.

With the method for preparing a container provided by this embodiment, the water absorptivity of the obtained oxidized nanocellulose can be adjusted by adjusting the oxidation conditions. As a result, the container capable of self-adjusting the air permeability as described in the previous embodiments can be prepared conveniently and quickly with simple steps and mild conditions, which is easy to realize industrial production.

In another aspect of the present disclosure, a further embodiment of the present disclosure provides another method for preparing the container described above. According to an embodiment of the present disclosure, referring to FIG. 6, the method may comprise the following steps.

S10: performing oxidation treatment on celluloses to obtain oxidized celluloses.

According to an embodiment of the present disclosure, the cellulose can be oxidized in this step by a conventional oxidation method which can be flexibly selected by those skilled in the art as needed. In some embodiments, the celluloses may be oxidized under a TEMPO-NaClO-NaBr system, a $NO_2$ system, a nitrate system, or the like. In some embodiments, the celluloses may be oxidized using a TEMPO-NaClO-NaBr system. In this step, the celluloses may be oxidized in the same condition to obtain oxidized celluloses having the same content of carboxyl groups.

According to an embodiment of the disclosure, the form of the cellulose used in this step is not limited at all, which may be any conventional pure cellulose, a cellulose-containing raw material, or the like. In some embodiments, the cellulose in this step is provided in the form of a bleached kraft pulp.

S20: performing homogenization treatment on the oxidized celluloses to obtain oxidized nanocelluloses.

According to an embodiment of the present disclosure, this step may be performed according to conventional homogenization treatment, and specific conditions and parameters may be flexibly selected by those skilled in the art as needed. In some embodiments, a specific homogenization process may refer to FIG. 5.

S30: performing modification treatment on the oxidized nanocelluloses with a polysaccharide solution to obtain a slurry comprising at least one type of oxidized nanocellulose. The oxidized nanocelluloses may be modified using polysaccharide solutions at different concentrations to obtain modified oxidized nanocelluloses having different contents of carboxyl groups, so that the modified oxidized nanocelluloses have different degrees of expansion after absorbing moisture in the same environment. Alternatively, it is also possible that a part of the oxidized nanocelluloses is modified using only one polysaccharide solution and the remaining oxidized nanocelluloses are not modified. Thereafter, the obtained modified oxidized nanocelluloses and the unmodified oxidized nanocelluloses are mixed to form a slurry.

According to an embodiment of the disclosure, in this step, the hydroxyl group in the polysaccharide is able to react with the carboxyl group in the oxidized nanocellulose to form an ester group with poor water absorptivity. The higher the concentration of the polysaccharide solution is, the higher the content of carboxyl groups taking part in the reaction will be, the lower the content of carboxyl groups in the obtained modified oxidized nanocellulose will be, otherwise, the higher the content of carboxyl groups in the obtained modified oxidized nanocelluloses will be. Therefore, the modified oxidized nanocelluloses having different contents of carboxyl groups may be obtained by using polysaccharide solutions at different concentrations. The conditions for reaction of the polysaccharide with the oxidized nanocelluloses can be set by those skilled in the art according to conventional conditions. For example, in some embodiments, in this step, polysaccharide solutions (such as starch solutions) at different concentrations may be added to the solutions obtained after the homogenization treatment respectively, which are then reacted under stirring at a suitable temperature, thereby obtaining modified oxidized nanocelluloses having different contents of carboxyl groups.

S40: pouring the slurry comprising at least two types of modified oxidized nanocelluloses into a mold and performing drying treatment.

According to an embodiment of the present disclosure, in this step, a suitable mold may be selected according to the shape of the container to be obtained, and pouring the slurry into the mold enables the slurry to form a predetermined shape. The slurry is then subjected to drying treatment. Specific drying conditions are not particularly limited, and may be flexibly selected depending on the categories of raw materials, the performance of the container to be obtained, etc., which may be, for example, vacuum drying or the like. For example, in some embodiments, the slurry may be poured into a mold having a flat surface, and after drying, paper for food preservation can be obtained.

In some embodiments, paper for food preservation can be prepared by filtration in this step. For example, a microporous filter membrane may be placed on a sand core, and a certain amount of the slurry (such as a reaction solution obtained directly after the modification treatment) comprising modified oxidized nanocelluloses is taken for filtration, that is, the slurry comprising different modified oxidized nanocelluloses is filtered using a microporous filter membrane to filter out water, and the slurry from which water has been filtered out is then dried. For example, after the slurry on the filter membrane is dehydrated and concentrated into a jelly-like thin layer, it will be removed together with the filter membrane. A microporous filter membrane is used to cover the thin layer, and two pieces of ordinary filter paper are then placed on the upper and lower surfaces of the combination of the microporous filter membrane and the thin layer, respectively, which is then put into a vacuum drying oven and pressed by a glass sheet for drying. The filter paper is then removed to obtain paper for food preservation.

With this method, the container previously described can be prepared conveniently and quickly with simple steps and mild conditions, which is easy to realize industrial production. This method can flexibly adjust the water absorptivity of the obtained oxidized nanocellulose by adjusting the concentration of the polysaccharide, thereby conveniently and quickly preparing the above-described container capable of self-adjusting the air permeability with simple steps and mild conditions, which is easy to realize industrial production.

Figure 6:
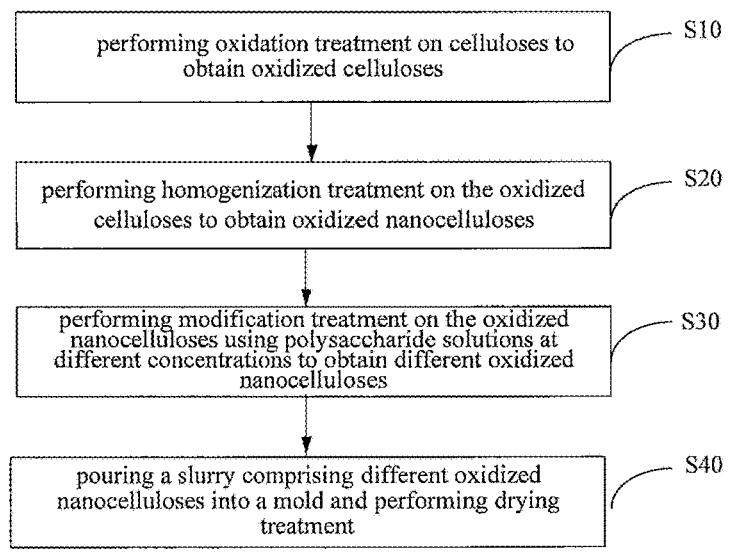
FIG. 6 is a flow chart of a method for preparing a container according to another embodiment of the present disclosure.
Figure 7:
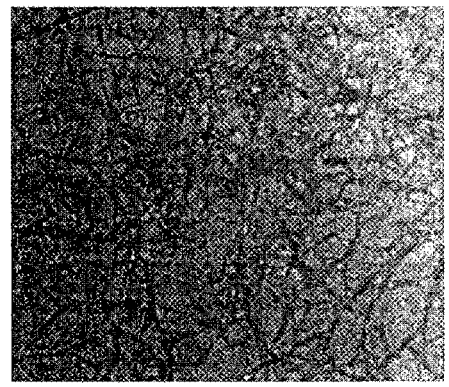
FIG. 7 is an example of a transmission electron micrograph of an oxidized nanocellulose according to an embodiment of the present disclosure.
Figure 8:
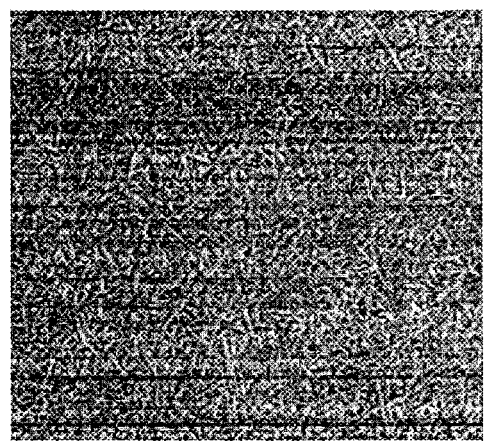
FIG. 8 is an example of an atomic force micrograph of a preservative paper according to an embodiment of the present disclosure.

Some of the steps in the embodiment shown in FIG. 6 are exemplarily illustrated below. In an example, the cellulose comprises a bleached kraft pulp. In this case, the bleached kraft pulp may be oxidized using the TEMPO-NaClO-NaBr system to obtain an oxidized cellulose, and the oxidized cellulose is then homogenized to obtain an oxidized nanocellulose (an example of a photograph of the oxidized nanocellulose obtained by an electron microscope is shown in FIG. 7). Then, a starch solution having a concentration of 0.04 wt % is added to an oxidized nanocellulose dispersion having a concentration of 0.2 wt % to modify the oxidized nanocellulose, obtaining a modified oxidized nanocellulose. The obtained modified oxidized nanocellulose and the unmodified oxidized nanocellulose are mixed to form a slurry, and the slurry is formed into a preservative paper 1 having a thickness of 40 μm by filtration (an example of a photograph of the preservative paper obtained by an atomic force microscope is shown in FIG. 8). The unmodified oxidized nanocellulose is formed into a preservative paper 2 having a thickness of 40 μm using the same method as described above.

Figure 9:
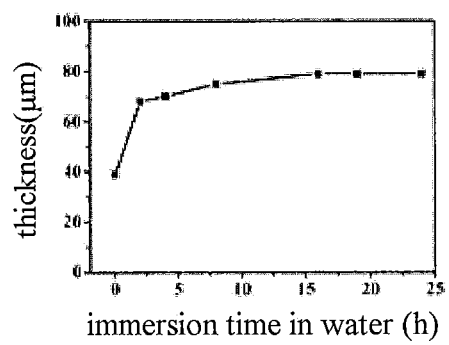
FIG. 9 is a graph showing a thickness test result for a preservative paper after absorbing moisture according to an embodiment of the present disclosure.
Figure 10:
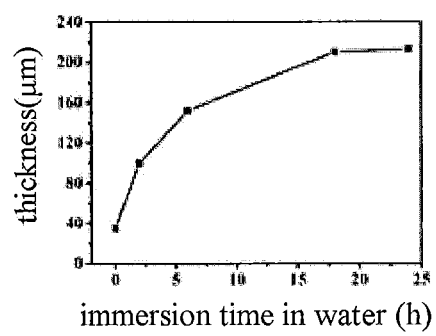
FIG. 10 is a graph showing a thickness test result for another preservative paper after absorbing moisture according to another embodiment of the present disclosure.

The preservative paper 1 and the preservative paper 2 are immersed in water. Taking the time when they are just immersed in water as a start time, the thicknesses of the preservative paper 1 and the preservative paper 2 are tested every 5 hours. The test results for the preservative paper 1 and the preservative paper 2 immersed in water for 20 hours are shown in FIG. 9 (preservative paper 1) and FIG. 10 (preservative paper 2), respectively. It can be seen from FIGS. 9 and 10 that the thickness of the preservative paper 2 becomes 2 mm after being immersed in water for 20 hours, i.e., expanding by 50 times. The thickness of the preservative paper 1 becomes about 80 μm after being immersed in water for 20 hours, i.e., expanding only by 2 times. Of course, the specific degree of expansion of the preservative paper 1 may be adjusted by modifying the oxidized nanocellulose using polysaccharide solutions at different concentrations.

In the description of the disclosure, it is to be understood that the terms "first" and "second" are used for descriptive purposes only and are not to be construed as indicating or implying a relative importance or implicitly indicating the number of technical features denoted. Thus, features defined with "first" and "second" may include one or more of the features either explicitly or implicitly. In the description of the present disclosure, unless specifically defined otherwise, "a plurality" means two or more, and "at least one" means one or more.

In the description of the specification, the terms "one embodiment", "some embodiments", "example", "specific example", "some examples", and the like mean that specific features, structures, materials or characteristics described in conjunction with the embodiment or example are included in at least one embodiment or example of the present disclosure. In the specification, the schematic representations of the above terms are not necessarily directed to the same embodiment or example. Furthermore, the particular features, structures, materials, or characteristics described may be combined in a suitable manner in any one or more embodiments or examples. In addition, various embodiments or examples described in the specification, as well as features of various embodiments or examples, may be combined by those skilled in the art without conflicting.

While embodiments of the disclosure have been shown and described above, it can be understood that the foregoing embodiments are illustrative and are not to be construed as limiting the scope of the present application. Those ordinarily skilled in the art can make variations, amendments, substations and modifications to the embodiments described above within the scope of the present disclosure.

The invention claimed is:

1. A container comprising at least two types of oxidized nanocelluloses interlaced with each other, the at least two types of oxidized nanocelluloses being configured to have different degrees of expansion after absorbing moisture in a same environment,
    wherein the at least two types of oxidized nanocelluloses comprise an unmodified oxidized nanocellulose and a modified oxidized nanocellulose, and
    wherein the unmodified oxidized nanocellulose and the modified oxidized nanocellulose have different contents of carboxyl groups.

2. The container according to claim 1, wherein the at least two types of oxidized nanocelluloses comprise at least one nanocellulose selected from a group consisting of a spheroidal oxidized nanocellulose, a rod-shaped oxidized nanocellulose, and a fibrous oxidized nanocellulose.

3. The container according to claim 1, wherein the container comprises at least one selected from a group consisting of a bag, a box, a bowl, a dish, a preservative film, and a preservative paper.

4. A method for preparing the container according to claim 1, comprising:
    performing oxidization treatment on celluloses in different conditions respectively to obtain at least two types of oxidized celluloses, the at least two types of oxidized celluloses having different contents of carboxyl groups;
    performing homogenization treatment on the at least two types of oxidized celluloses to obtain a slurry comprising the at least two types of oxidized nanocelluloses; and pouring the slurry comprising the at least two types of oxidized nanocelluloses into a mold and performing drying treatment.

5. The method according to claim 4, wherein pouring the slurry comprising the at least two types of oxidized nanocelluloses into the mold and performing drying treatment comprises:

filtering the slurry comprising the at least two types of oxidized nanocelluloses using a microporous filter membrane to filter out water, and drying the slurry from which water has been filtered out.

6. The method according claim 4, wherein the celluloses comprise a bleached kraft pulp.

7. A method for preparing the container according to claim 1 comprising:

performing oxidization treatment on celluloses to obtain oxidized celluloses;

performing homogenization treatment on the oxidized celluloses to obtain the oxidized nanocelluloses;

performing modification treatment on a part of the oxidized nanocelluloses using only one polysaccharide solution while the remaining oxidized celluloses are not modified;

mixing the modified oxidized nanocelluloses and the unmodified oxidized nanocelluloses to obtain a slurry; and pouring the slurry into a mold and performing drying treatment.

8. The method according to claim 7, wherein pouring the slurry into the mold and performing drying treatment comprises:

filtering the slurry using a microporous filter membrane to filter out water, and drying the slurry from which the water has been filtered out.

9. The method according to claim 7, wherein the celluloses comprise a bleached kraft pulp.

10. A container comprising at least two types of oxidized nanocelluloses interlaced with each other, the at least two types of oxidized nanocelluloses being configured to have different degrees of expansion after absorbing moisture in a same environment, wherein the at least two types of oxidized nanocelluloses comprise an unmodified oxidized nanocellulose and a modified oxidized nanocellulose, and wherein the modified oxidized nanocellulose comprises a polysaccharide-modified oxidized nanocellulose.

11. The container according to claim 10, wherein the polysaccharide-modified oxidized nanocellulose comprises a starch-modified oxidized nanocellulose.

12. A container comprising at least two types of oxidized nanocelluloses interlaced with each other, the at least two types of oxidized nanocelluloses being configured to have different degrees of expansion after absorbing moisture in a same environment, wherein the at least two types of oxidized nanocelluloses comprise a spheroidal oxidized nanocellulose, and wherein the spheroidal oxidized nanocellulose comprises an oxidized nanocellulose shell defining an accommodation space, and wherein a cellulose hydrolase filled in the accommodation space.

* * * * *